Patented Dec. 11, 1945

2,390,621

UNITED STATES PATENT OFFICE 2,390,621

TREATING OLEFIN POLYMERS

Bernard H. Shoemaker, Hammond, Ind., and Edmond L. d'Ouville, Chicago, Ill., assignors to Standard Oil Company, Chicago, Ill., a corporation of Indiana No Drawing. Application March 30, 1942, Serial No. 436,769

13 Claims. (Cl. 260—94)

This invention relates to high molecular weight organic substances of the character of plastics, rubber and elastomers or polymeric compounds having elastic properties. More particularly, the invention relates to high molecular weight linear olefin polymers and to a process of hardening or vulcanizing olefin polymers especially isoolefin polymers, such as the polymers of isobutylene.

One object of the invention is to convert heavy isoolefin polymers and linear mono-olefin polymers generally into a form vulcanizable by sulfur. Another object of the invention is to desaturate isobutylene polymers or resins known as viscoresins by a rapid, simple and economical process.

It is known that when liquid isoolefins, such as liquid isobutylene, are subjected to the action of a Friedel-Crafts type catalyst, preferably at low temperature, there will result polymers of high molecular weight, generally ranging from 1000 to 200,000 or even higher. The molecular weights of these very heavy hydrocarbons are most conveniently determined by the Staudinger viscosity method. The lower the temperature of the polymerization, the higher the molecular weight of the product. The very high molecular weight materials, of the order of 50,000 to 150,000, are obtained at temperatures of the order of $-100°$ F. The low temperature for the reaction is conveniently obtained by direct cooling, using an inert diluent which is also a refrigerant, that is, one which boils at the desired reaction temperature. Liquid propane, liquid ethane and liquid ethylene are examples. Solid $CO_2$ may also be used directly in the reaction mixture. Indirect cooling may be employed if efficient cooling surface is provided to remove the heat of the polymerization reaction sufficiently rapidly.

By Friedel-Crafts catalysts we mean to include those active metal halides hydrolyzable by water to produce halogen acid. Aluminum chloride and aluminum bromide are examples. Boron fluoride, boron chloride, ferric chloride, tin tetrachloride and titanium tetrachloride may also be mentioned. These may be used alone or mixed or as the mixed halides, such as boron chlor fluoride. If desired, they may be added to the reaction mixture in solution in a chlorinated solvent such as $CCl_4$ or $C_2H_4Cl_2$.

The polymerization of the isoolefin may be carried out with the pure isoolefin alone or with mixtures of isoolefins with one another, with inert diluents or with other unsaturated hydrocarbons which have the faculty of co-polymerizing with the isoolefins. One example of the latter reaction is the co-polymerization of isobutylene with a small amount of butadiene brought about by adding about 1 to 20% of butadiene to the isobutylene. Unsaturated halogen compounds may also be co-polymerized with the isoolefins, such as methallyl chloride.

The reaction is normally quite rapid, being complete within 5 minutes to 1 or 2 hours and it may be halted at any point desired by adding a quenching agent which deactivates the catalyst. The alcohols, such as ethyl and isopropyl alcohols, aqueous ethyl ether, ammonia, caustic alkali solutions, and various similar substances of low freezing point may be conveniently employed as quenching agents.

The product of the reaction is generally a viscous or semi-solid plastic, sticky mass, difficult to handle unless retained in solution. Inert solvents such as liquid butane, hexane, naptha, etc. may be added before, during or after polymerization to facilitate handling the product. After washing, the polymer product may be separated from the solution by evaporation or by precipitation with other solvents such as acetone which has the property of throwing down the polymer of high molecular weight. The solvent-free polymer product obtained in this way may be a sticky, viscous, plastic material with a slight tendency to flow or it may be a tough, rubbery solid, depending on molecular weight. For the present invention, we prefer to employ polymers of higher molecular weight, of the order of 50,000 to 100,000 or higher. However, our dehydrogenation-vulcanization process may also be applied to polymers of lower molecular weight, for example, polymers with molecular weights upwards of 10,000 and for certain purposes the softer, sticky materials, with molecular weights upwards of 1000, may be usefully rendered less soft and sticky and given other useful properties by treatment in accordance with our invention. Thus, sulfur-containing materials suitable as addition agents for lubricating oils may be obtained from the soft polymers.

An important characteristic of the isoolefin polymers, particularly the isobutylene polymers obtained in the foregoing manner, is their chemical unreactivity which is traceable to their unusual chemical structure. Investigations have shown that the structure of the isobutylene polymers is probably a chain of indefinite length, depending on molecular weights, having the carbon atoms arranged in the following manner:

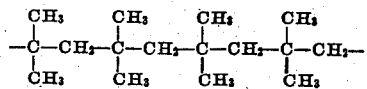

This structure provides no tertiary hydrogen which is known to be readily replaceable. It provides the secondary hydrogen in a position of unreactivity where stearic hindrance apparently prevents its being replaced in the manner one would normally expect. As a consequence, the isobutylene polymers resist attack by chemical agents such as sulfuric acid and they are difficult to halogenate, especially at low temperatures.

We have now discovered that these polymers may be readily attacked by halogens in the presence of substantial quantities of active metal halides or Friedel-Crafts catalyst, particularly aluminum chloride. Under these conditions the reaction may be carried out at ordinary temperatures or with refrigeration. None of the ordinary halogenating catalyst such as iodine or actinic light are needed. Furthermore, we have discovered that the halogen does not remain in the hydrocarbon but is removed as halogen acid. For example, when isobutylene polymers are treated with chlorine in the presence of substantial amounts of aluminum chloride, the chlorine may be mostly all accounted for by the HCl gas evolved in the reaction. As the reaction proceeds, the polymers form a dark colored complex with aluminum chloride. At the end of the reaction this complex is decomposed with water, alcohol, alkalies, etc., and the hydrocarbon product is recovered as a light colored product, the dark color of the complex being discharged when the complex is decomposed by the water.

The reaction product obtained in this way is an unsaturated material, substantially free of halogen, having approximately the same physical characteristics as the viscoresin treated. The degree of unsaturation depends on the amount of chlorine used in the reaction and may be regulated at will. The chemical characteristics resulting from the unsaturation render the product susceptible to vulcanization by the action of sulfur, sulfur chloride, or other sulfur compounds, strong elastic products being obtained. If the degree of unsaturation produced by the chlorine treatment is sufficiently great, hard, inelastic, plastic products may be obtained on vulcanization if desired.

It will be observed that the reaction of halogens under these conditions is not a true halogenation but rather a dehydrogenation by means of halogen. To this reaction we apply the term "halodehydrogenation." The part played by the aluminum chloride in this reaction is not entirely understood but it is believed that the aluminum chloride may rearrange the structure of the hydrocarbon polymer in such a way as to activate certain of the hydrogen atoms. It is otherwise difficult to account structurally for the removal of hydrogen molecules in which no two adjacent carbon atoms each contain replaceable hydrogen.

In order to produce the desired reaction product, it is important that the isoolefin polymer be treated in such a manner that little or no reduction in molecular weight occur in the process inasmuch as the desired physical properties, strength, elasticity, resiliency, etc. are only obtainable in compounds of high molecular weight. Accordingly, it is undesirable to conduct the reaction at elevated temperatures tending to bring about a reduction in molecular weight of the isoolefin polymers. The effect of temperature is especially marked in the presence of chemical reagents, HCl, aluminum chloride, chlorine, etc. Accordingly, it is desirable to keep the temperature below about 175° F. and preferably below 125° F. A satisfactory range is 32° F. to room temperature. At these low temperatures, the polymer would normally be unattacked by chlorine, but in the presence of the aluminum chloride the halodehydrogenation reaction can be carried out smoothly at quite low temperatures, as low as 0° F. and lower.

It is desirable to employ a solvent for the hydrocarbon polymer in the halodehydrogenation treatment. For this purpose we may use hydrocarbon solvents such as butane, hexane, straight run petroleum napthas, etc. or $CS_2$, carbon tetrachloride, methylchloride, methylene chloride and inert halogenated solvents generally.

The following examples show the character of the halodehydrogenation reaction when applied to isobutylene polymers having a molecular weight of about 100,000. To a carbon tetrachloride solution containing 40 grams of the polymer there was added 1 gram of aluminum chloride dissolved in $CCl_4$. The addition of 15 grams of bromine produced no reaction even when heated to 160° F. On adding more aluminum chloride, however, a vigorous reaction took place with the evolution of HBr. Ten (10) grams of aluminum chloride were added before the reaction was complete. Substantially all of the bromine was recovered as HBr. Alcohol was added to deactivate the aluminum chloride and decompose the complex. The product was precipitated from the solution with acetone with a yield of 20 grams.

In another experiment 16.5 grams of $AlCl_3$ were added to a hexane solution of 43 grams of isobutylene polymer. To the mixture there was then added 10 grams of bromine and after two hours, alcohol was added and the hexane was removed by heating on the steam bath. The product was washed with hot water and acetone and then vulcanized, one sample for two hours at 325° F. and another sample for four hours at 225° F., the following vulcanization mixture being employed:

|  | Parts |
| --- | --- |
| Polymer | 38 |
| Sulfur | 2 |
| ZnO | 3 |
| Stearic acid | 2 |
| Tuads (tetramethylthiuram disulfide) | 1 |
| Mercaptobenzothiazole | 1 |

The vulcanized products were definitely superior to the original polymer in strength and elasticity.

In another operation the polymer of 100,000 molecular weight was dissolved in carbon tetrachloride. Aluminum chloride equivalent to 40% of the polymer was dispersed in the solution. Bromine equivalent to 25% by weight of the viscoresin was dissolved in carbon tetrachloride and added gradually, drop by drop, over a period of one hour. The reaction temperature was held at 32° F. All the bromine reacted and HBr was evolved. After two hours the temperature was allowed to rise to 50° F. and then 95% ethyl alcohol was added to quench the aluminum chloride. The product was hydrolyzed and washed six times with water while still in the carbon tetrachloride solution. Carbon tetrachloride was then mostly removed by a stream of nitrogen at 100° F. The concentrated solution was poured into acetone to precipitate the product which was finally washed with acetone to remove most of the carbon tetrachloride. The yield was approximately 90%, based on the hydrocarbon polymer charged. When vulcanized in the manner described above, using sulfur and accelerators, a tough, strong, elastic material was obtained.

Although the experiments just described were conducted with the isolated polymer from the mono-olefin polymerization reaction, we contemplate carrying out the halodehydrogenation step of the process in direct conjunction with the polymerization step in the following manner: The liquid isobutylene or other isoolefin hydrocarbon is polymerized by the addition of a solution of aluminum chloride in a chlorinated solvent, for example, ethylene dichloride. When the polymerization is complete at the low temperature, e. g., 0 to —100° F., there is added the desired amount of halogen, for example, fluorine, chlorine or bromine. More aluminum chloride or bromide may be added at the same time if desired. The mixture may be held at the low temperature of the polymerization reaction for a period of time to permit the halodehydrogenation reaction to go to completion or the mixture may be allowed to warm up and remain at 32° F. or at room temperature to permit completion of the halodehydrogenation reaction before quenching the reaction with water, alcohol, or other quenching reagent.

Operating in this manner, the same catalyst employed for the polymerization of the isoolefin may serve also in the halodehydrogenation reaction. Likewise, the intermediate steps of isolating the hydrocarbon polymer from the polymerization reaction are rendered unnecessary. We may also use a different catalyst for the two steps of the reaction when operating in this way. Thus, we may carry out the polymerization with BF$_3$ and then, leaving the BF$_3$ in the reaction mixture, we may add aluminum chloride or other active metal halide for the halodehydrogenation reaction.

The amount of Friedel-Crafts catalyst required for the polymerization is relatively small, generally of the order of ½% to 5% of the weight of the isoolefin present. Larger amounts may be used, however, if desired, especially in the case of the combined operation where the catalyst is retained in the mixture through the halodehydrogenation step of the process. The amount of Friedel-Crafts catalyst employed in the halodehydrogenation reaction is generally about 20 to 50% of the weight of the hydrocarbon treated. The amount required depends to some extent on the amount of halogen to be added. In general, about 30 to 40% of aluminum chloride is sufficient for vulcanization purposes but for certain special uses, where less halogen is employed, the amount of Friedel-Crafts catalyst may be reduced to 10 or 15% in the halodehydrogenation step.

The amount of halogen employed will vary with the degree of unsaturation desired. Where chlorine is employed, the amount may be from 5% to 50% of the weight of the resin, or more. Thus, in some cases an amount of chlorine may be added equal to 1 to 3 times the weight of the resin. The same holds true for other halogens.

The halodehydrogenated isoolefin polymer may be employed for other purposes besides vulcanization. Lower molecular weight polymers, for example, may be subjected to mild sulfurization with elemental sulfur or with one of the sulfur chlorides, SCl$_2$ or S$_2$Cl$_2$ to produce addition agents for lubricating oils. Nitrogen derivatives may also be prepared by treatment with nitric acid, and sulfuric acid esters may be prepared by treating with strong sulfuric acid, SO$_3$ or sulfuryl chloride. Phosphorus compounds useful for addition to lubricating oils may be prepared by treatment with phosphorus chlorides or phosphorus sulfides, for example, phosphorus pentasulfide, or by the direct addition of elemental phosphorus. The de- saturated resins have important drying properties and are useful in paints and varnishes, in lieu of or admixed with drying oils.

Having thus described our invention, what we claim is:

1. The process of preparing an unsaturated high molecular weight hydrocarbon polymer from a substantially saturated linear polymer having a molecular weight above 1000 resulting from the polymerization of an olefin hydrocarbon with a Friedel-Crafts catalyst at a temperature below 0° F. comprising subjecting the said substantially saturated polymer to the action of a halogen in the presence of at least 10% by weight of a Friedel-Crafts catalyst at about 32 to 175° F. whereby substantially all the added halogen is eliminated as halogen acid, then separating the catalyst from the resulting unsaturated polymer product.

2. The process of claim 1 wherein the treatment with halogen is conducted in the presence of 10% to 50% of aluminum chloride, based on the weight of the hydrocarbon polymer employed.

3. The process of claim 1 wherein the treatment with halogen is carried out in the presence of 30–40% of aluminum chloride, based on the weight of the hydrocarbon polymer employed.

4. A vulcanizable rubber-like hydrocarbon polymer of high molecular weight prepared by the halodehydrogenation of a substantially saturated linear polymer of isobutylene having a molecular weight upwards of 50,000 wherein the said polymer is treated with at least 5% by weight of halogen in the presence of at least 10% of a Friedel-Crafts catalyst, then separated from the catalyst by washing.

5. The product of claim 4 wherein the Friedel-Crafts cataylst is aluminum chloride.

6. The product of claim 4 wherein the Friedel-Crafts catalyst is aluminum bromide.

7. The process of producing unsaturated high molecular weight resins which comprises polymerizing an isoolefin hydrocarbon at a temperature below about 0° F. in the presence of a Friedel-Crafts catalyst to give a polymer with a molecular weight above 1000, then without separating the polymer from the reaction mixture, subjecting said polymer to halodehydrogenation by adding to said reaction mixture at least 10% of anhydrous aluminum chloride and then at least 5% of a halogen, maintaining the temperature of the mixture below room temperature until said halodehydrogenation reaction is substantially complete and separating the unsaturated resin from the aluminum chloride.

8. The process of claim 7 wherein a halogenated hydrocarbon solvent is employed in said halodehydrogenation reaction.

9. The process of claim 7 wherein polymerization is effected in the presence of anhydrous aluminum chloride.

10. The process of claim 7 wherein polymerization is effected in the presence of boron fluoride.

11. The process of producing a vulcanizable hydrocarbon resin which comprises polymerizing liquid isobutylene with boron fluoride catalyst at a low temperature below 0° F., thereby producing a linear polymer with a molecular weight above 1000, adding at least 10% by weight of anhydrous aluminum chloride to the polymer product and boron fluoride catalyst and passing into the mixture at least 10% by weight of chlorine while holding the reaction mixture below about 32° F. until halodehydrogenation is substantially complete.

12. The process of desaturating substantially saturated, linear isobutylene polymer resins having molecular weights above about 1000 whereby said resins are rendered more reactive and vulcanizable which comprises treating said resins with at least 5% of chlorine in the presence of 10 to 50% of aluminum chloride at a temperature of about 32 to 175° F. whereby hydrochloric acid is eliminated and substantially no chloride remains in combination with said resin and thereafter separating the desired desaturated resin from the aluminum chloride.

13. The process of making a rubber-like material from a substantially saturated linear polymer having a molecular weight above about 10,000 resulting from the polymerization of an olefin hydrocarbon with a Friedel-Crafts catalyst at a temperature below 0° F., comprising subjecting said substantially saturated polymer to the action of a halogen in the presence of at least 10 per cent by weight of aluminum chloride at about 0 to 175° F. whereby substantially all the added halogen is eliminated as halogen acid and an unsaturated polymer product is produced, separating the unsaturated polymer product from the reaction mixture and vulcanizing the product to produce the rubber-like material in the desired form.

BERNARD H. SHOEMAKER.
EDMOND L. D'OUVILLE.